United States Patent [19]

Kraus et al.

[11] 4,323,661
[45] Apr. 6, 1982

[54] SINTERABLE, FINELY DIVIDED VINYL CHLORIDE MOLDING COMPOSITION AND A PROCESS FOR ITS MANUFACTURE AND USE

[75] Inventors: Helmut Kraus, Töging; Jürgen Weinlich, Eppstein; Otto Plewan, Neuötting, all of Fed. Rep. of Germany

[73] Assignee: Hoechst Aktiengesellschaft, Fed. Rep. of Germany

[21] Appl. No.: 263,581

[22] Filed: May 14, 1981

[30] Foreign Application Priority Data

May 17, 1980 [DE] Fed. Rep. of Germany ....... 3018922

[51] Int. Cl.³ ............................................ C08F 265/04
[52] U.S. Cl. .................................... 525/259; 525/261; 525/302
[58] Field of Search .................. 525/259, 261, 302

[56] References Cited

U.S. PATENT DOCUMENTS

| | | | |
|---|---|---|---|
| 3,322,858 | 5/1967 | Coaker et al. | 525/302 X |
| 3,358,054 | 12/1967 | Bonn et al. | 525/302 X |
| 3,632,672 | 1/1972 | Kuhne et al. | 525/302 X |
| 4,006,201 | 2/1977 | Bauer et al. | 525/302 |
| 4,155,954 | 5/1979 | Büning et al. | 525/302 |

Primary Examiner—Carman J. Seccuro
Attorney, Agent, or Firm—Connolly and Hutz

[57] ABSTRACT

The sinterable polyvinyl chloride molding composition described is composed of 99.8 to 97% by weight, relative to the molding composition, of a suspension graft copolymer which is, in turn, composed of 99.7 to 85% by weight of polymerized vinyl chloride units, 0.9 to 10.5% by weight of polymerized ethylene units and 0.09 to 10.5% by weight of polymerized vinyl acetate units, with the proviso that the total of the polymerized ethylene and vinyl acetate units is 0.3 to 15% by weight, relative to the graft copolymer, and also 0.01 to 0.5% by weight, relative to the molding composition, of at least one free alkylarylsulfonic acid having 3 to 16 C atoms in the alkyl chain or at least one alkylsulfonic acid having 8 to 16 C atoms, and also 0.005 to 0.5% by weight, relative to the molding composition, of at least one water-soluble wetting agent which is free from metal ions and contains 12 to about 80 C atoms and a quaternary N atom which forms a salt with a carboxylic or sulfonic acid group. The molding composition gives sintered moldings, particularly separator plates for electrical cells, which have advantageous properties.

10 Claims, No Drawings

SINTERABLE, FINELY DIVIDED VINYL CHLORIDE MOLDING COMPOSITION AND A PROCESS FOR ITS MANUFACTURE AND USE

The invention relates to a molding composition, composed of a sinterable polymer which is prepared by graft copolymerization in aqueous suspension and which chiefly contains polymerized vinyl chloride units, to a process for its preparation and to its use for the manufacture of separator plates for electrical cells.

The use of polyvinyl chloride for the manufacture of separator plates for electrical cells is known. At first, attempts were made to use products prepared by the customary processes for the suspension polymerization of vinyl chloride. However, polymers of this type generally have an excessively high average particle size, which results in very coarse-pored sintered plates. But even a finely divided suspension polyvinyl chloride still has the disadvantage of poor wettability, which obstructs the passage of the electrolyte through the separator plate.

In order to avoid this difficulty, it is known to carry out the suspension polymerization of vinyl chloride in the presence of fairly small quantities of emulsifiers, such as are used for the emulsion polymerization of vinyl chloride, for example the sodium salt of alkylbenzenesulfonic acids, alkylsulfuric acids or sulfonated dialkylsuccinic acid esters, to mix the polymers thus obtained with emulsion polyvinyl chloride and to add small quantities of a nonionic antistatic agent. Although this improves the wettability, a deterioration in the mechanical properties of the sintered plates must be accepted in exchange. In addition, owing to the comparatively high content of surface-active substances, and particularly of the emulsifier(s), separator plates manufactured in this way tend to foam in the electrical cell.

These disadvantages are eliminated by a further known process in which the suspension polymerization is carried out in the presence of specific free sulfonic acids instead of the sodium salts of these acids, which are known for emulsion polymerization, and in the presence of nonionic wetting agents. Without being mixed with emulsion polyvinyl chloride, the resulting product produces sintered plates which have good wettability and good mechanical properties, but it is not completely satisfactory either, since the heat stability is reduced, the flow properties of the powder and its capacity for being metered on the plate sintering machine leaves something to be desired and, if processed for a fairly long period, corrosion takes place on the parts of the machine.

These disadvantages are largely eliminated by a further development of the process described in the preceding paragraph, in which the free sulfonic acids which are present in the molding composition as a result of the polymerization and which in some cases are also additionally mixed into the molding composition subsequently, are partially neutralized by specific tertiary organic amines. In this case, the presence of nonionic wetting agents in the suspension polymerization is not absolutely necessary. Separators for electrical cells which have good mechanical and electrical properties can be produced without difficulties from the molding compositions produced in this manner. However, interest has recently been shown in separator plates which have a lower average pore diameter for the same electrical volume resistivity, since this makes it possible to reduce the plate thickness, as a result of which there is a considerable saving in material in the manufacture of the plates. In addition, the lower pore size reduces the risk of "interpenetration" of the plates by electrically conducting precipitates and thus the formation of so-called "short circuit bridges".

A molding composition which fully satisfies the recent requirements for a sinterable polyvinyl chloride within the meaning described above has now been found. This sinterable, finely divided molding composition based on polyvinyl chloride having a K-value of 55 to 75, a bulk density of 450 to 700 g/l, a plasticizer absorption of 5 to 20% by weight, a content of metal cations of less than 0.01% by weight, relative to the molding composition, an average particle size of 10 to 50 $\mu$m and a particle size distribution of 99 to 30% by weight <33 $\mu$m, 1 to 60% by weight from 33 to 63 $\mu$m, 0 to 9% by weight from 63 to 125 $\mu$m and 0 to 1% by weight >125 $\mu$m, consists of 99.8 to 97% by weight, relative to the molding composition, of a graft copolymer which has been prepared by suspension polymerization in an aqueous phase and which is in turn composed of 99.7 to 85% by weight, relative to the graft copolymer, of polymerized units of vinyl chloride, 0.09 to 10.5% by weight, relative to the graft copolymer, of polymerized units of ethylene and 0.09 to 10.5% by weight, relative to the graft copolymer, of polyermized units of vinyl acetate, with the proviso that the total of the polymerized units of ethylene and vinyl acetate is 0.3 to 15% by weight;

0.01 to 0.5% by weight, relative to the molding composition, of at least one of the following free sulfonic acids: alkylsulfonic acids having 8 to 16 C atoms and alkylarylsulfonic acids having 3 to 16 C atoms in the alkyl chain; and 0.005 to 0.5% by weight, relative to the molding composition, of at least one water-soluble wetting agent which is free from metal ions and contains 12 to about 80 C atoms and a quaternary N atom which forms a salt with a carboxylic or sulfonic acid group, said molding composition also contains residues of suspending agents and residues of activators and other polymerization auxiliaries and also, in some cases, small quantities of further additives.

If the total of the polymerized units of ethylene and vinyl acetate in the graft copolymer is below 0.3% by weight, relative to the graft copolymer, molding compositions having a lower bulk density are obtained. The separator plates produced from these exhibit a higher average pore diameter which is, in general, not more favorable than that which can be achieved by means of molding compositions according to the state of the art. If the total of polymerized units of ethylene and vinyl acetate in the graft copolymer is over 15% by weight, the molding compositions have a high bulk density and the average pore diameter of the separator plates produced from them is advantageous, but the electrical volume resistivity of the plates increases, which is undesirable for the purpose for which they are used. In addition, molding compositions obtained from a graft copolymer containing more than 15% by weight of polymerized units of ethylene and vinyl acetate have also less interest from an economic point of view. Particularly good results in respect of properties and cost efficiency are displayed by molding compositions containing a graft copolymer which is, in turn, composed of 99.5 to 95% by weight, relative to the graft copolymer, of polymerized units of vinyl chloride, 0.15 to 3.5% by weight, relative to the graft copolymer, of polymerized units of ethylene, and 0.15 to 3.5% by weight, relative to the graft copolymer, of polymerized units of vinyl acetate, with the proviso that the total of the polymerized units of ethylene and vinyl acetate is 0.5 to 5% by weight. In particular, the molding composition contains a graft copolymer which is composed of: 99.5 to 97% by weight, relative to the graft copolymer, of polymerized units of vinyl chloride and 0.5 to 3% by weight of the total of the polymerized units of ethylene and vinyl acetate.

The content of metal cations in the molding composition should be less than 0.01% by weight, relative to the molding composition. At a higher content, a deterioration is observed in the mechanical properties of the sintered plates produced from the molding composition. The same applies if the molding compositions contain less than 0.01% by weight of the free sulfonic acids mentioned. If the content of free sulfonic acids in the molding compositions rises above 0.5% by weight, although the mechanical properties of the sintered plates are still good, difficulties occur to an increasing extent in processing the molding compositions, owing to inadequate heat stability and corrosion on the processing machines. In addition, higher contents of free sulfonic acids make the molding composition more expensive. It is preferable to employ molding compositions containing 0.05 to 0.25% by weight, relative to the molding composition, of at least one of the free sulfonic acids mentioned earlier in the text.

The quantity of wetting agent in the molding composition should be 0.005 to 0.5% by weight, relative to the molding composition. Below 0.005% by weight, the capillary rise required for a good quality of separator plates is not achieved. Above 0.5% by weight of wetting agent, there is an aincreasing risk of foaming if the separator plates are employed in electrical cells in which gas is evolved when they are used or while they are being charged or which are subject to frequent mechanical shocks during use. Good results are obtained if the molding compositions contain 0.01 to 0.1% by weight of at least one of the wetting agents described.

The wetting agent used should contain virtually no metal cations, that is to say less than 0.5% by weight of metal cations. It should be adequately soluble in water, that is to say to the extent of more than 2% by weight at 20° C., and should contain 12 to about 80 C atoms and a quaternary N atom which forms a salt with a carboxylic or sulfonic acid group. A "quaternary N atom" is to be understood as meaning an N atom which carriers a positive charge and exhibits 4 bonds, of which 1 to 4 bonds are with C atoms and the remainder (3 to 0) are bonds with H atoms. It is preferable to employ wetting agents in which the quaternary N atom has 3 or 4 bonds with C atoms. This positively charged quaternary N atom forms a salt with a carboxylic (—COO⁻) or sulfonic (—SO₃⁻) acid group, the negative charge of which compensates for the positive charge on the N atom. The said acid group can be a constituent of a molecule which does not contain the quaternary nitrogen atom or it can also be contained in the same molecule as the quaternary nitrogen atom. In the latter case it is a so-called "internal salt", which is usually also described as a "betaine" or "sulfobetaine".

The wetting agents employed are preferably compounds of the following formulae:

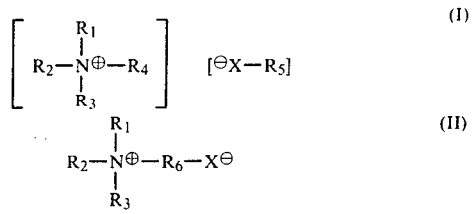

in which X denotes a $-COO^-$ or an $-SO_3^-$ group, $R_1$ denotes hydrogen or an alkyl or arylalkyl group, $R_2$, $R_3$ and $R_4$ independently of one another denote an alkyl or arylalkyl group which can optionally be interrupted in the alkyl chain by ether oxygen bridges, particularly in such a manner that there are $-C_2H_4O-$ or $-C_3H_6O-$ groups in the chain, $R_5$ denotes an alkyl or alkylaryl radical and $R_6$ denotes an alkylene radical, all the radicals $R_1$ to $R_6$, including X if approxiate, together containing 12 to about 80 carbon atoms and at least one of the radicals $R_1$ to $R_4$, and also the radical $R_5$, each containing at least 8 carbon atoms.

It is particularly preferable to employ the internal salts according to the second formula indicated above, containing a total of 12 to about 30 C atoms. It is also possible to use several of the wetting agents described in greater detail above.

The K-value of the graft copolymer contained in the molding composition is appropriately within the range from 55 to 75. At a K-value below 55 and at a K-value above 75, the molding compositions are more difficult to process and generally produce sintered plates of a poorer quality.

The bulk density of the molding compositions is appropriately within the range from 450 to 700 g/l. Lower bulk densitites generally result in a lower rate of production and in plates which have coarser pores and less good mechanical properties, while higher bulk densities generally result in plates which have an undesirably high electrical volume resistance. It is preferable to employ molding compositions which have a bulk density of 570 to 670 g/l.

The plasticizer absorption of the molding composition is 5 to 20% by weight, preferably 5 to 12% by weight.

In order to produce sintered plates which are used as separators for electrical cells, the molding composition should have an average particle size (average particle diameter) of 10 to 50 μm, determined by sedimentation analysis. At an average particle size above 50 μm, the plates produced tend to have coarse pores to an increasing extent, while at an average particle size below 10 μm it is generally excessively difficult to produce plates which are still adequately permeable. It is preferable to employ molding compositions which have an average particle size of 20 to 35 μm. Sedimentation analysis is recommended for the determination of the average particle size, since it measures particles sizes more accurately in the range below 33 μm and is less susceptible to interference caused by the polymer particles becoming electrostatically charged.

The invention also relates to a process for the preparation of a molding composition described in greater detail above by suspension polymerization of vinyl chloride in an aqueous phase in the presence of oil-soluble activators which decompose to form free radicals, suspension stabilizers, free emulsifier acids and, if appropriate, further polymerization auxiliaries, removing the bulk of the aqueous phase and drying the polymer, further substances in a state of fine division being added to the polymer, if appropriate, after removing the aqueous phase or after drying, which comprises carrying out polymerization in the presence of 0.27 to 17.5% by weight, relative to vinyl chloride employed, of a copolymer which is, in turn, composed of 30 to 70% by weight, relative to the copolymer, of polymerized units of ethylene and 70 to 30% by weight, relative to the copolymer, of polymerized units of vinyl acetate, and which has an average molecular weight, determined by osmotic methods, of 5,000 to about 200,000, and also in the presence of 0.005 to 1.5% by weight, relative to vinyl chloride employed, of a free alkylsulfonic acid having 8 to 16 C atoms or a free alkylarylsulfonic acid having 3 to 16 C atoms in the alkyl chain, or mixtures of several of these acids, the content of sulfonic acid in the polymer formed being determined after the removal of the bulk of the aqueous phase and sufficient of the sulfonic acids and wetting agents which are described in greater detail below being added to the polymer in a finely divided form for the polymer to contain a total of 0.01 to 0.5% by weight, relative to the dried polymer, of the said sulfonic acids and 0.005 to 0.5% by weight, relative to the dried polymer, of the said wetting agents.

The polymerization is carried out at temperatures of 45° to 70° C. in pressure-resistant equipment, with agitation of the polymerization liquor, the ethylene/vinyl acetate copolymer appropriately being dissolved before the commencement of polymerization in the liquid vinyl chloride. It is appropriate to employ, per 100 parts of vinyl chloride monomer employed, about 150 to 300 parts of water, 0.01 to 0.2 part of an oil-soluble activator which decomposes to form free radicals and is known for the suspension polymerization of vinyl chloride, or a mixture of several such activators, and 0.05 to 3 parts by weight of a known suspending agent which is customary for the suspension polymerization of vinyl chloride, for example a cellulose ether or a partially saponified polyvinyl acetate or mixtures of such suspending agents. It is also possible to add known chain-terminating agents and/or antioxidants and also further polymerization auxiliaries when carrying out the polymerization. In the case of all the substances or auxiliaries employed for the polymerization, care should be taken that they do not contain any metal cations or, if this is technically unavoidable, only contain small quantities of metal cations.

The polymerisation is generally carried out to conversions of 85%, relative to vinyl chloride employed. Although molding compositions which are still quite usable within the scope of the invention are obtained even at lower degrees of conversion, lower degrees of conversion are less cost-efficient and generally offer no other advantages.

If, nevertheless, it is intended to carry out polymerization to a conversion lower than 85%, it must be borne in mind that the total quantity of the ethylene/vinyl acetate copolymer employed is present in the graft copolymer produced, but that considerable quantities of the vinyl chloride monomer employed have not been converted and will escape in the form of gas when the pressure in the polymerization vessel is released. Accordingly, in these cases it is necessary to employ a smaller quantity of the ethylene/vinyl acetate copolymer and also of the free sulfonic acid, depending on the conversion desired.

After termination of the polymerization and after cooling and releasing the pressure in the polymerization vessel and expelling residual monomers which would cause interference, the polymer formed is separated from the aqueous polymerisation liquor by customary methods, for example by filtration, decantation or centrifuging, and the content of free sulfonic acid in the polymer is determined, for example by acidimetric titration with benzyldimethyl-2,2-p-1,1-3,3-tetramethyl-butylphenoxyethoxyethylammonium chloride (see the journal "Fette, Seifen, Anstrichmittel", volume 73 (1971), page 683: Deutsche Einheitsmethoden zur Untersuchung von Fetten, Fettprodukten und verwandten Stoffen ("German Standard Methods for the Determination of Fats, Fat Products and Related Substances"), 43rd Bulletin, Prof. Seber, "Analyse von organischen, grenzflächenaktiven Stoffen II" ("The Analysis of Organic, Surface-Active Substances II"); and see also "Die Analytik der Tenside" ("The Analysis of Surface Active Agents") by R. Wickbold, published by Hüls AG 1976, pages 30 et seq.).

On the basis of the analytical result, either the same free sulfonic acid which was also used in the polymerization or another free alkylsulfonic acid having 8 to 16 C atoms or a free alkylarylsulfonic acid having 3 to 16 C atoms in the alkyl chain, is now added to the polymer in a quantity which enables the desired total content of free sulfonic acid in the polymer to be achieved.

If the quantity of free sulfonic acid, originating from the polymerization and determined by analysis, in the polymer should be too high, it is possible, by adding compounds of the formulae

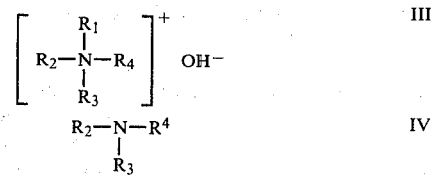

wherein $R_1$, $R_2$, $R_3$ and $R_4$ have the same meaning as described earlier in the text, to convert the excess fraction of the free sulfonic acids into quaternary ammonium salts of these acids, which act as wetting agents and, if appropriate, should be deducted from the total quantity of wetting agent to be added. If tertiary amines according to the second formula above are used for the partial neutralization of the free sulfonic acid, wetting agents of the type

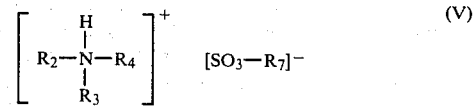

wherein $R_2$, $R_3$ and $R_4$ have the meaning described earlier in the text, while $R_7$ represents an alkyl radical having 8 to 16 C atoms or an alkylaryl radical having 3 to 16 C atoms in the alkyl chain, are formed.

After termination of the polymerization and, appropriately, also after separating off the bulk of the aqueous liquor, if necessary, sufficient of the free sulfonic acids described in greater detail above or sufficient of compounds of the formulae III and/or IV is added to the polymer for the latter to contain, after being dried, 0.01 to 0.5% by weight, relative to the dry polymer, of free sulfonic acid.

In addition, after the polymerization and, appropriately, after separating off the bulk of the aqueous polymerization liquor, at least one water-soluble wetting agent which is free from metal ions and contains 12 to about 80 C atoms and a quaternary N atom which forms a salt with a carboxylic or sulfonic acid group, is added to the polymer in such a quantity that the dry polymer contains 0.005 to 0.5% by weight of the said wetting agent(s). As already mentioned, in the event of partial neutralization of the free sulfonic acids, the quota of compounds of the formula V which has been formed therefrom should be deducted, as described above, from the supplementary quantity of water-soluble wetting agent free from metal ions.

It is preferable to carry out the process in such a way that no neutralization of free sulfonic acids is necessary after the polymerization, and the total quantity of the wetting agent is added to the polymer in the form of compounds of the formula II. The said compounds can be added after the polymerization either to the polymer which is moist with water or to the polymer when the latter is already dry. To achieve better distribution, the compounds to be added can be used in the form of solutions or suspensions or dispersions in water, and the solubility can be improved by an admixture of, for example, aliphatic alcohols having 1 to 4 C atoms. These solutions or suspensions are appropriately brought into contact with the polymer in a finely divided state, for example in a sprayed or atomized state. During the addition of these compounds, it is appropriate to agitate the polymer, for example by stirring, turning over, fluidizing, centrifuging, trickling down, atomizing or grinding.

After the compounds have been added, the water present in the mixture and any further readily volatile substances which may be present are removed by customary drying methods. In general, this renders the sinterable, finely divided molding composition ready for use. In special cases, small quantities of substances free from metal salts, for example antioxidants, heat stabilizers, pigments or agents for improving the antistatic properties, can be mixed into the molding composition, insofar as this is necessary.

If the polymerization is to be carried out in the presence of major quantities, for example more than 0.2% by weight, relative to vinyl chloride employed, of a free alkylsulfonic acid having 8 to 16 C atoms or a free alkylarylsulfonic acid having 3 to 16 C atoms in the alkyl chain or mixtures of several of these acids, it is appropriate to start the polymerization using 0.005 to 0.02% by weight, relative to vinyl chloride employed, of the said free acids, and to add the remaining quantity of the free sulfonic acid, up to the total quantity of not more than 1.5% by weight, relative to vinyl chloride employed, to the polymerization liquor in one or more portions or continuously, after a conversion of about 30% has been reached.

In a particularly preferred embodiment of the process according to the invention, polymerization is carried out in the presence of 0.01 to 0.2% by weight, relative to vinyl chloride employed, of the sulfonic acids mentioned above. The invention also relates to the use of the described molding compositions for the production of sintered moldings, particularly separator plates for electrical cells.

As already mentioned initially, the molding compositions according to the invention are distinguished, compared with those according to the state of the art, by the fact that they produce sintered plates which have a lower average pore diameter, while having the same volume resistivity, capillary rise, ultimate tensile strength and elongation at break, which makes it possible, with a saving of material, to produce thinner separator plates which, additionally, also display the advantage of a lower tendency for conductive material to "interpenetrate". In addition, compared with known molding compositions of approximately comparable properties, the molding compositions according to the invention have a higher bulk density and good free-flowing properties, which facilitates processing and improves the output of production equipment.

The examples and comparison tests which follow are intended to illustrate the invention in greater detail. For the sake of clarity, the test results have been compiled in a table. The various properties were determined by the following methods:

K-value: as specified in DIN 53,726.

Bulk density: as specified in DIN 53,468.

Plasticizer absorption: A filter paper saturated in di-2-ethylhexyl phthalate (DOP) is placed so as to fit tightly on the perforated interior plate of a centrifuge beaker insert (a laboratory centrifuge as specified in DIN 58,970 E) and the insert is weighed together with the filter paper (weight $m_1$). 10.0 g of polymer sample are then weighed into this insert (weight $m_2$) and approx. 20 grams of DOP are then added and the mixture is allowed to stand for about 5 minutes. Centrifuging is then carried out for 60 minutes at a centrifugal acceleration of 25,000 to 26,000 m²/s at the base of the perforated insert. The insert is cleaned on the outside by wiping with filter paper and is weighed together with its contents (weight $m_3$). The plasticizer absorption, which is, inter alia, a measure of the porosity of the polymer particles, is calculated (in % by weight) from the formula $$\frac{m_3 - m_2}{m_2 - m_1} \cdot 100.$$

The figures quoted are average values from 10 individual determinations.

Quantity of free sulfonic acid: By acidimetric titration with benzyldimethyl-2,2-p-1,1,3,3-tetramethylbutylphenoxyethoxyethylammonium chloride as specified in "German Standard Methods for the Analysis of Fats, Fat Products and Related Substances", 43rd Bulletin, Prof. Seber: "Analysis of Organic, Surface-Active Substances II" in the journal: "Fette, Salze, Anstrichmittel", volume 73 (1971) page 683.

Particle size distribution: By air jet sieve analysis as specified in DIN Draft No. 53,734.

Average particle diameter: By sedimentation analysis using the following process: 1.82 grams of polyvinyl chloride are dispersed in 600 ml of a 0.09% strength solution of sodium pyrophosphate which has been thoroughly degassed, and the tendency to settle out is measured using a Sartorius type 4600 sedimentation balance at a rate of travel of the recording paper of 120 mm/hour. Calculation is carried out by the known Stoke's formula and gives the radius of the particles. The latter is evaluated by means of the Rosin-Ramler and Sperling particle size grid.

Free-flowing properties: As recommended by J. Gäbler "Kunststoffe Hoechst" ("Hoechst Plastics"), Reprint No. 6172 "Prüfung von PVC-Pulvern" ("The Testing of PVC Powders"), page 2, item 4 (1977). The test is carried out by a method in which 6 funnels having different charging apertures are filled with powder and the number of the funnel out of which the powder just still flows out freely is quoted. The higher the funnel number, the poorer the free-flowing properties.

Determination carried out on the sintered plate: Production of the sintered plates: separator plates for electrical cells are produced on a continuous belt-sintering machine. In this process, polyvinyl chloride powder is applied in a specific film thickness to an endless steel belt and is sintered by being passed through an oven, controlled at a temperature of 325° C. by electrical heating. By varying the speed of the belt, the dwell time in the sintering zone and thus the extent of sintering of the PVC powder can be controlled. The belt speed is adjusted to values between 1.5 and 1.9 m/minute, preferably 1.7 m/minute, so that the resulting electrical resistance of the finished separator plates is 1.6 m$\Omega$/dm$^2$. The separator plates have a sheet thickness of 0.2 mm and a rib thickness of 0.7 mm.

Elongation at break and ultimate tensile strength: The elongation at break (elongation at breaking force) and the ultimate tensile strength are determined by a method based on DIN Specification 53,455—The Tensile Testing of Plastics. Since no standardised test specimens are available, test pieces measuring 60×140 mm are cut out from the sintered plates. Testing is carried out on a tensile testing machine conforming to the general conditions for tensile testing machines (DIN 51,220, Class 1 and DIN 51,221), after storage for 16 hours in a standard atmosphere (DIN 5,001) at 23°±2° C. and 50±5% relative atmospheric humidity. The test speed (the speed at which the two clamping jaws move apart) is 50 mm per minute ±10%. The range at which the force is measured is 10 N. Force and elongation are recorded via a recording mechanism on a roll of graph paper. The forward feed proportional to elongation (graph paper: crosshead) is adjusted to give an enlargement of 5 to 1. The elongation is related to a free clamped length of 100 mm.

Electrical volume resistivity: The electrical resistance of separators is determined by measuring the so-called internal resistance of cells, and this is carried out in a test set-up specially devised for the purpose (a battery cell). The difference in the cell resistance with and without the separator gives the negative resistance of the separating element. The volume resistivity is determined in $\Omega$. cm by multiplying by the ratio of plate area to plate thickness.

The test cell itself comprises a positive plate and a negative plate (PbO$_2$ and Pb) which are mounted parallel to one another at a distance of 7 mm. The electrodes are plates of the same size and design as are used in a lead accumulator. The separator is accurately located between the electrodes in a window-shaped recess measuring 100×100 mm. The test cell is filled with sulfuric acid of density 1.28 g per cm$^3$ and is fully charged. The determination of such low-resistance internal resistance values is carried out using a direct reading micro-ohmmeter (type EMT 326, made by Elektromesstechnik E. Franz KG, Lahr) which is attached to two electrodes. Mains alternating current is employed.

Capillary rise: Determination of the capillary rise is used as a measure of the wettability of the separator plates and as a means of characterising the porosity. This is effected by placing a strip of separator 1 cm wide in a test tube filled to a depth of 1.5 cm with water. The height, in millimeters, wetted after an immersion time of 10 minutes is quoted as the capillary rise.

Average pore diameter and maximum pore diameter: These are determined by analogy with the method in the publication by Griebel, Martens and Behrens in "Plaste und Kautschuk", 19th year of publication (1972), pages 285 and 286.

EXAMPLES 1 TO 19 AND COMPARISON TESTS A TO C

The preparation of sinterable molding compositions by the process according to the invention and in accordance with the comparison tests was effected in the following manner. A mixture composed of vinyl chloride, an ethylene/vinyl acetate copolymer having an average molecular weight of 10 to 30,000, determined by osmotic methods, demineralized water, a suspending agent, an emulsifier and an activator, such as are shown by type and quantity in Table I which follows (comparative test A was carried out with no ethylene/vinyl acetate copolymer present), is stirred for 4 hours at 20° C. in a 400 l stirred autoclave made of V$_4$A stainless steel, in order to dissolve the ethylene/vinyl acetate copolymer completely in the vinyl chloride monomer. The mixture is then warmed, with continued stirring, to the temperature which is also shown in the table and is polymerized at this temperature until the pressure has fallen to 0.4 MPa. The pressure is then released, the finely particulate polymer suspension produced is freed from residual vinyl chloride monomer by a known process, and the polymer is separated from the bulk of the aqueous polymerization liquor by means of a decanter centrifuge. The product thus obtained still contains approx. 20% by weight of water, relative to the product. A sample of the water-moist polymer is taken and its content of free sulfonic acid is determined by titration, as described above. This content is quoted in Table II which follows, in percent by weight, relative to the dried product. In comparison test A and Examples 1 to 18, the substances which are also shown by type and quantity in Table II are now added, as a solution in water by spraying the water-moist product, with agitation of the latter. The quantity figures in the table are percentages by weight, relative to the dried product. After the substances have been added, the product is dried with hot air (inlet temperature 150° C., exit temperature 85° C.).

The properties indicated in Table II are determined on the molding composition obtained in this way. Sintered plates are produced from part of the molding composition and these are used for the determination of the properties, which are also listed in Table II. The methods of determination and of producing the plates are described in greater detail earlier in the text.

In Table I which follows, the symbols have the following meanings:
PW=parts by weight
% by weight of VAc=percentage by weight of polymerized vinyl acetate, relative to the ethylene/vinyl acetate copolymer (the remainder is polymerized ethylene units)
MC 440=methylcellulose, a 2% strength by weight aqueous solution of which has a viscosity of 440 mPa.s at 20° C.

MC 50=methylcellulose, a 2% strength by weight aqueous solution of which has a viscosity of 50 mPa.s at 20° C.

HPC 50=methylhydroxypropylcellulose, a 2% strength by weight aqueous solution of which has a viscosity of 50 mPa.s at 20° C.

DBA=n-dodecylbenzenesulfonic acid

DBANa=sodium n-dodecylbenzenesulfonate

AA=an n-alkanesulfonic acid of a chain length varying from $C_{12}$ to $C_{16}$, with a preponderant content of $C_{14}$ AANa=sodium salt of the n-alkanesulfonic acid described above IPP=diisopropyl peroxydicarbonate LPO=dilauroyl peroxide TBPND=tert.-butyl perneodecanoate showing how many parts by weight of ethylene/vinyl acetate copolymer per 100 parts by weight of vinyl chloride were employed in the polymerization. The fourth vertical column shows the sulfonic acid content, determined by titration, of the moist polymer from the decanter, quoted in percent by weight, relative to dry material. The fifth vertical column shows the percentage by weight, relative to dry substance, of sulfonic acid which was subsequently added to the moist polymer from the decanter. The sixth vertical column contains data on the type of the sulfonic acid added, the same abbreviations as in Table I being used. The seventh vertical column shows the percentage by weight, relative to dry material, of wetting agent added. A tertiary amine which, with the excess sulfonic acid present, forms a salt effective as a wetting agent, was added in

TABLE I

| Comparison test (V)/ Example (B) | | VA | VB | VC | B1 | B2 | B3 | B4 | B5 | B6 |
|---|---|---|---|---|---|---|---|---|---|---|
| Vinyl chloride | PW | 100 | 100 | 100 | 100 | 100 | 100 | 100 | 100 | 100 |
| Ethylene/vinyl acetate copolymer | PW | — | 1 | 7 | 1 | 3 | 7 | 1 | 3 | 7 |
| | % by weight of VAc | — | 45 | 45 | 45 | 40 | 45 | 45 | 40 | 45 |
| Water | PW | 198 | 200 | 200 | 200 | 200 | 200 | 200 | 200 | 200 |
| Suspending agent | PW | 0,5 | 0,2 | 0,8 | 0,2 | 0,35 | 0,8 | 0,2 | 0,3 | 0,8 |
| | Type | MC 440 | MHPC 50 | MC 440 | MHPC 50 | MC 440 | MHPC 50 | MHPC 50 | MC 50 | MC 440 |
| Emulsifier | PW | 0,15 | 0,02 | 0,08 | 0,02 | 0,035 | 0,08 | 0,02 | 0,03 | 0.08 |
| | Type | DBA | DBANa | AANa | DBA | DBA | DBA | AA | AA | AA |
| Activator | PW | 0,02 | 0,02 | 0,02 | 0,02 | 0,03 | 0,03 | 0,04 | 0,05/ 0.02 | 0,02 |
| | Type | IPP | IPP | IPP | IPP | IPP | IPP | IPP | LPO/ TBPND | IPP |
| Polymerization temperature, °C. | | 60 | 60 | 61 | 60 | 57 | 57 | 55 | 66 | 61 |

The following information is given in Table II which follows: the subsequent treatment of the polymers which are prepared in accordance with Table I, the properties of the molding compositions thus produced and the properties of the sintered plates produced from these molding compositions. The first vertical column of this table gives the serial designation of the test, capital letters being used for comparative tests and numbers for examples according to the invention. The second vertical column of Table II indicates which polymer, prepared in accordance with Table I, was used. The third vertical column contains an extract from Table I comparison test A, in accordance with German Offenlegungsschrift No. 2,646,595. The eighth vertical column shows which wetting agent was added; the symbols in this column have the following meanings:

DHEA=N-dodecyl-N,N-dihydroxyethylamine

CDMB=N-coconut alkyl-N,N-dimethylbetaine, "coconut alkyl" denoting a mixture of alkyl groups having the following distribution of chain lengths (in %): $C_8=7$; $C_{10}=6$; $C_{12}=51$; $C_{14}=19$; $C_{16}=8$; $C_{18}=9$.

SDMB=N-stearyl-N,N-dimethylbetaine

DDMB=N-n-dodecyl-N,N-dimethylbetaine.

TABLE II

| Comparison test Example No. | Polymer (Table I) | PW of EVAc/ 100 PW of VC | Acid content (by titration), % by weight | Acid added, % by weight | Type of acid | Wetting agent added, % by weight | Type of wetting agent | K-value | Bulk density g/l | Plasticizer absorption % | >125 μm | >63 μm <125 μm | >33 μm <63 μm | <33 μm | Average particle diameter | Free-flowing properties, funnel No. | Ultimate tensile strength N/m | Elongation at break, % | Volume resistivity Ω·cm | Capillary rise, mm | Average pore φ, μm | Maximum pore φ, μm |
|---|---|---|---|---|---|---|---|---|---|---|---|---|---|---|---|---|---|---|---|---|---|---|
| A | VA | — | 0,08 | 0,08 | DBA | 0,05 | DHEA | 65,3 | 160 | 15 | 0 | 0,7 | 9,1 | 90,2 | 24 | 6 | 9,5 | 5,5 | 3,3 | 127 | 18 | 24 |
| B | VB | 1 | — | — | — | — | — | 65,0 | 630 | 7,1 | 0 | 0,4 | 16,9 | 82,7 | 30 | 4 | <0,1 | <1 | not measurable | not measurable | — | — |
| C | VC | 7 | — | — | — | — | — | 64,4 | 608 | 7,3 | 0 | 0,3 | 6,3 | 93,4 | 25 | 4 | <0,1 | <1 | 2,9 | 125 | 10,5 | 14,7 |
| 1 | B1 | 1 | 0,01 | 0,14 | DBA | 0,03 | CDMB | 65,2 | 612 | 8,9 | 0 | 0,9 | 15,1 | 84,0 | 28 | 4 | 6,1 | 5,0 | 3,1 | 122 | 11,8 | 15,1 |
| 2 | B4 | 1 | 0,01 | 0,14 | AA | 0,03 | CDMB | 69,5 | 634 | 7,6 | 0,1 | 0,7 | 24,3 | 74,9 | 30 | 4 | 6,3 | 4,7 | 3,5 | 130 | 10,2 | 14,3 |
| 3 | B1 | 1 | 0,01 | 0,14 | DBA | 0,03 | CDMB | 65,2 | 612 | 8,9 | 0 | 0,9 | 15,1 | 84,0 | 28 | 4 | 6,5 | 4,7 | 2,8 | 122 | 11,2 | 14,8 |
| 4 | B1 | 1 | 0,01 | 0,08 | DBA | 0,03 | CDMB | 65,2 | 612 | 8,9 | 0 | 0,9 | 15,1 | 84,0 | 28 | 4 | 5,9 | 4,9 | 3,0 | 140 | 10,6 | 14,3 |
| 5 | B1 | 1 | 0,01 | 0,14 | DBA | 0,08 | CMDB | 65,2 | 612 | 8,9 | 0 | 0,9 | 15,1 | 84,0 | 28 | 4 | 6,2 | 5,2 | 3,2 | 110 | 10,4 | 14,3 |
| 6 | B1 | 1 | 0,01 | 0,14 | DBA | 0,01 | SDMB | 65,2 | 612 | 8,9 | 0 | 0,9 | 15,1 | 84,0 | 28 | 4 | 6,3 | 5,0 | 2,8 | 120 | 10,5 | 14,5 |
| 7 | B1 | 1 | 0,01 | 0,14 | DBA | 0,03 | SDMB | 65,2 | 612 | 8,9 | 0 | 0,9 | 15,1 | 84,0 | 28 | 4 | 6,0 | 5,1 | 3,4 | 129 | 10,1 | 14,2 |
| 8 | B1 | 1 | 0,01 | 0,20 | DBA | 0,05 | SDMB | 65,2 | 612 | 8,9 | 0 | 0,9 | 15,1 | 84,0 | 28 | 4 | 6,9 | 4,8 | 3,1 | 135 | 10,4 | 14,2 |
| 9 | B1 | 1 | 0,01 | 0,14 | DBA | 0,03 | DDMB | 65,2 | 612 | 8,9 | 0 | 0,9 | 15,1 | 84,0 | 28 | 4 | 5,9 | 5,2 | 3,3 | 128 | 11,1 | 15,3 |
| 10 | B4 | 1 | 0,01 | 0,14 | AA | 0,03 | CDMB | 69,2 | 634 | 7,6 | 0,1 | 0,7 | 24,3 | 74,9 | 30 | 4 | 5,6 | 4,8 | 5,1 | 126 | 8,5 | 13,3 |
| 11 | B3 | 7 | 0,05 | 0,10 | DBA | 0,03 | CDMB | 67,1 | 640 | 7,2 | 0 | 0,5 | 12,1 | 87,4 | 27 | 4 | 9,3 | 6,4 | 5,6 | 123 | 9,5 | 14,0 |
| 12 | B6 | 7 | 0,05 | 0,10 | AA | 0,03 | CDMB | 64,6 | 652 | 6,9 | 0 | 0,3 | 27,4 | 72,3 | 32 | 4 | 3,5 | 5,1 | 4,8 | 115 | 9,1 | 13,9 |
| 13 | B3 | 7 | 0,05 | 0,04 | AA | 0,03 | CDMB | 67,1 | 640 | 7,2 | 0 | 0,5 | 12,1 | 87,4 | 27 | 4 | 7,1 | 5,3 | 5,0 | 120 | 8,9 | 13,9 |
| 14 | B3 | 7 | 0,05 | 0,07 | DBA | 0,03 | CDMB | 67,1 | 640 | 7,2 | 0 | 0,5 | 12,1 | 87,4 | 27 | 4 | 8,3 | 5,9 | 5,8 | 133 | 8,5 | 13,5 |
| 15 | B3 | 7 | 0,05 | 0,02 | DBA | 0,03 | CDMB | 67,1 | 640 | 7,2 | 0 | 0,5 | 12,1 | 87,4 | 27 | 4 | 9,5 | 5,2 | 5,0 | 124 | 8,8 | 13,6 |
| 16 | B3 | 7 | 0,05 | 0,09 | DBA | 0,03 | SDMB | 67,1 | 640 | 7,2 | 0 | 0,5 | 12,1 | 87,4 | 27 | 4 | 8,8 | 6,2 | 4,1 | 122 | 9,8 | 13,6 |
| 17 | B2 | 3 | 0,02 | 0,08 | DBA | 0,03 | CDMB | 67,3 | 614 | 8,0 | 0,1 | 1,1 | 30,1 | 68,7 | 32 | 4 | 7,5 | 5,9 | 4,5 | 126 | 10,0 | 14,2 |
| 18 | B5 | 3 | 0,02 | 0,15 | AA | 0,03 | DDMB | 67,1 | 640 | 7,2 | 0 | 0,5 | 12,1 | 87,4 | 27 | 4 | 7,3 | 5,2 | 4,5 | 126 | 10,0 | 14,2 |

We claim:

1. Sinterable, finely divided molding composition, based on polyvinyl chloride having a K-value of 55 to 75, a bulk density of 450 to 700 g/l, a plasticizer absorption of 5 to 20% by weight, a content of metal cations of less than 0.01% by weight, relative to the molding composition, an average particle size of 10 to 50 μm and a particle size distribution of 99 to 30% by weight <33 μm, 1 to 60% by weight from 33 to 63 μm, 0 to 9% by weight from 63 to 125 μm and 0 to 1% by weight >125 μm, which consisting essentially of:

99.8 to 97% by weight, relative to the molding composition, of a graft copolymer which has been prepared by suspension polymerization of vinyl chloride in the presence of an ethylene/vinyl acetate copolymer in an aqueous phase and which is in turn composed of 99.7 to 85% by weight, relative to the graft copolymer, of polymerized units of vinyl chloride, 0.09 to 10.5% by weight, relative to the graft copolymer, of polymerized units of ethylene and 0.09 to 10.5% by weight, relative to the graft copolymer, of polymerized units of vinyl acetate, with the proviso that the total of the polymerized units of ethylene and vinyl acetate is 0.3 to 15% by weight;

0.01 to 0.5% by weight, relative to the molding composition, of at least one of the following free sulfonic acids: alkylsulfonic acids having 8 to 16 C atoms and alkylarylsulfonic acids having 3 to 16 C atoms in the alkyl chain; and 0.005 to 0.5% by weight, relative to the molding composition, of at least one water-soluble wetting agent which is free from metal ions and contains 12 to about 80 C atoms and a quaternary N atom which forms a salt with a carboxylic or sulfuric acid group;

the remainder being: suspending agents, residues of activators and other polymerization auxiliaries and also, in some cases, small quantities of further additives.

2. Molding composition as claimed in claim 1, which contains a graft copolymer which is composed of 99.5 to 95% by weight, relative to the graft copolymer, of polymerized units of vinyl chloride, 0.15 to 3.5% by weight, relative to the graft copolymers, of polymerized units of ethylene and 0.15 to 3.5% by weight, relative to the graft copolymer, of polymerized units of vinyl acetate, with the proviso that the total of the polymerized units of ethylene and vinyl acetate is 0.5 to 5% by weight.

3. Molding composition as claimed in either of claims 1 or 2, which contains 0.05 to 0.25% by weight, relative to the holding composition, of at least one of the free sulfonic acids mentioned in claim 1.

4. Molding composition as claimed in any of claims 1 or 3, which contains 0.01 to 0.1% by weight, relative to the molding composition, of at least one wetting agent mentioned in claim 1.

5. Molding composition according to any of claims 1 to 4, which has a bulk density of 570 to 670 g/l.

6. Molding composition as claimed in any of claims 1 to 5, which has a average particle size from 20 to 35 μm.

7. Process for the production of a molding composition according to claim 1, by suspension polymerization of vinyl chloride in an aqueous phase in the presence of oil-soluble activators which decompose to form free radicals, suspension stabilizers and free emulsifier acids, removing the bulk of the aqueous phase and drying the polymer, further substances in a state of fine division may be added to the polymer, after removing the aqueous phase or after drying, which comprises carrying out polymerization in the presence of 0.27 to 17.5% by weight, relative to vinyl chloride employed, of a copolymer which is, in turn, composed of 30 to 70% by weight, relative to the copolymer, of polymerized units of ethylene and 70 to 30% by weight, relative to the copolymer, of polymerized units of vinyl acetate, and which also has an average molecular weight, determined by osmotic methods, of 5,000 to 200,000, and also in the presence of 0.005 to 1.5% by weight, relative to vinyl chloride employed, of a free alkylsulfonic acid having 8 to 16 C atoms or a free alkylarylsulfonic acid having 3 to 16 C atoms in the alkyl chain, or mixtures of several of these acids, the content of sulfonic acid in the polymer formed being determined after the removal of the bulk of the aqueous phase and sufficient of the sulfonic acids and wetting agents mentioned in claim 1 being added to the polymer in a finely divided form for the polymer to contain a total of 0.01 to 0.5% by weight, relative to the dried polymer, of the said sulfonic acids and 0.005 to 0.5% by weight, relative to the dried polymer, of the said wetting agents.

8. Process as claimed in claim 7, wherein polymerization is carried out in the presence of 0.01 to 0.2% by weight, relative to vinyl chloride employed, of the sulfonic acids mentioned in claim 7.

9. Process for the production of sintered moldings, by sintering the molding composition as claimed in any of claims 1 to 6.

10. The process of claim 9, wherein the moldings are separator plates for electrical cells.

* * * * *